Figure 1:
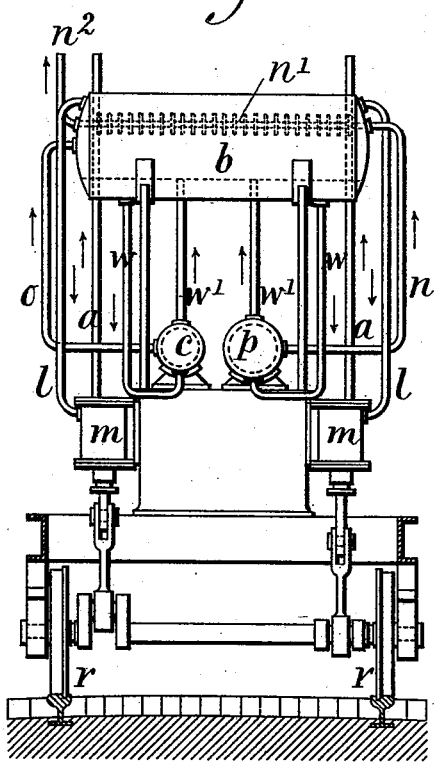

(No Model.) 4 Sheets—Sheet 1.
F. NEUKIRCH.
COMBINED PETROLEUM AND COMPRESSED AIR ENGINE FOR TRAMWAYS.
No. 507,032. Patented Oct. 17, 1893.

Witnesses:
G. W. Rea.
J. A. Saul.

Inventor:
Friedrich Neukirch,
By James L. Norris.
Atty.

(No Model.) 4 Sheets—Sheet 3.

F. NEUKIRCH.
COMBINED PETROLEUM AND COMPRESSED AIR ENGINE FOR TRAMWAYS.

No. 507,032. Patented Oct. 17, 1893.

Witnesses:
G. W. Rea.
J. A. Saul.

Inventor:
Friedrich Neukirch,
By James L. Norris.
Atty.

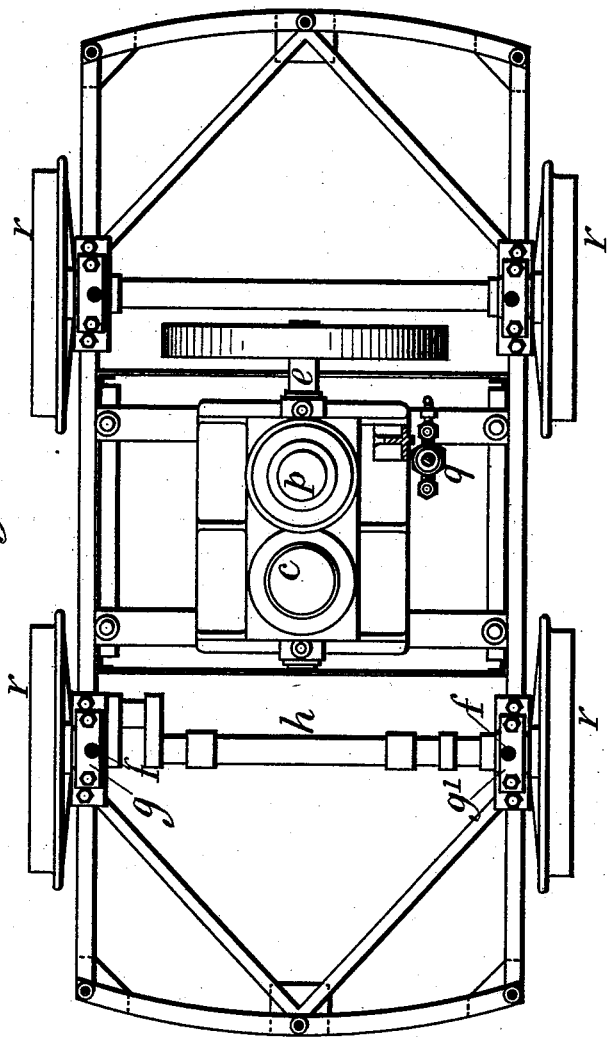

UNITED STATES PATENT OFFICE.

FRIEDRICH NEUKIRCH, OF BREMEN, GERMANY.

COMBINED PETROLEUM AND COMPRESSED-AIR ENGINE FOR TRAMWAYS.

SPECIFICATION forming part of Letters Patent No. 507,032, dated October 17, 1893.

Application filed August 12, 1893. Serial No. 482,976. (No model.) Patented in Italy February 7, 1893, LXV, 372.

*To all whom it may concern:*

Be it known that I, FRIEDRICH NEUKIRCH, a citizen of Germany, residing at Börse Zimmer, No. 19, Bremen, Germany, have invented a new and useful Combined Petroleum and Compressed-Air Engine for Tramways, (for which I have obtained a patent in Italy, dated February 7, 1893, Vol. LXV, 372,) of which the following is a specification.

This invention relates to a combined machine wherein a motor engine worked by petroleum, benzine, or gas, is caused to compress air which is then utilized in a compressed air engine for propelling the tramway vehicle. By this combined arrangement of petroleum or gas and compressed air motors the advantage is gained that the petroleum motor can work continuously at full power whether the vehicle is running or standing still, for accumulating power in a receiver, in the form of compressed air, which is then used in greater or less quantity in the compressed air engine for propelling the vehicle, according as this is required to run fast or slow, or is ascending or descending inclines.

The compressed air engine is arranged with controlling and reversing gear in the same manner as a steam engine, so as to run backward or forward at any required speed, quite independently of the petroleum engine.

The high temperature of the discharge gases of the petroleum engine is utilized for heating the air under pressure, the gases being for this purpose made to pass through a pipe coil or through pipes having radiating ribs or flanges situated within the compressed air reservoir. The lower part of the air reservoir is made at the same time to constitute a water reservoir containing the water required for cooling the cylinders of the petroleum engine and the air pump. This water is subject to the pressure in the air reservoir, and can evaporate under such pressure. The steam thus produced mixes with the compressed air, and thus also supplies power for working the air engine. The air under pressure is thus kept moist and consequently does not act detrimentally in the engine as dry air does.

The cylinders of the petroleum engine as also of the air pump have a temperature during working which corresponds to the evaporating temperature of the water under the pressure existing in the air reservoir, in a similar manner to an ordinary steam engine. On a decrease of pressure taking place in the air reservoir, the water, in consequence of its specific heat, can generate a further quantity of steam, so that the water also acts as an accumulator of power. Water is supplied to the reservoir to make good the loss by evaporation, by a small feed pump worked by the air engine. The air reservoir is provided with a gage-glass for indicating the quantity of water therein.

Figure 2:
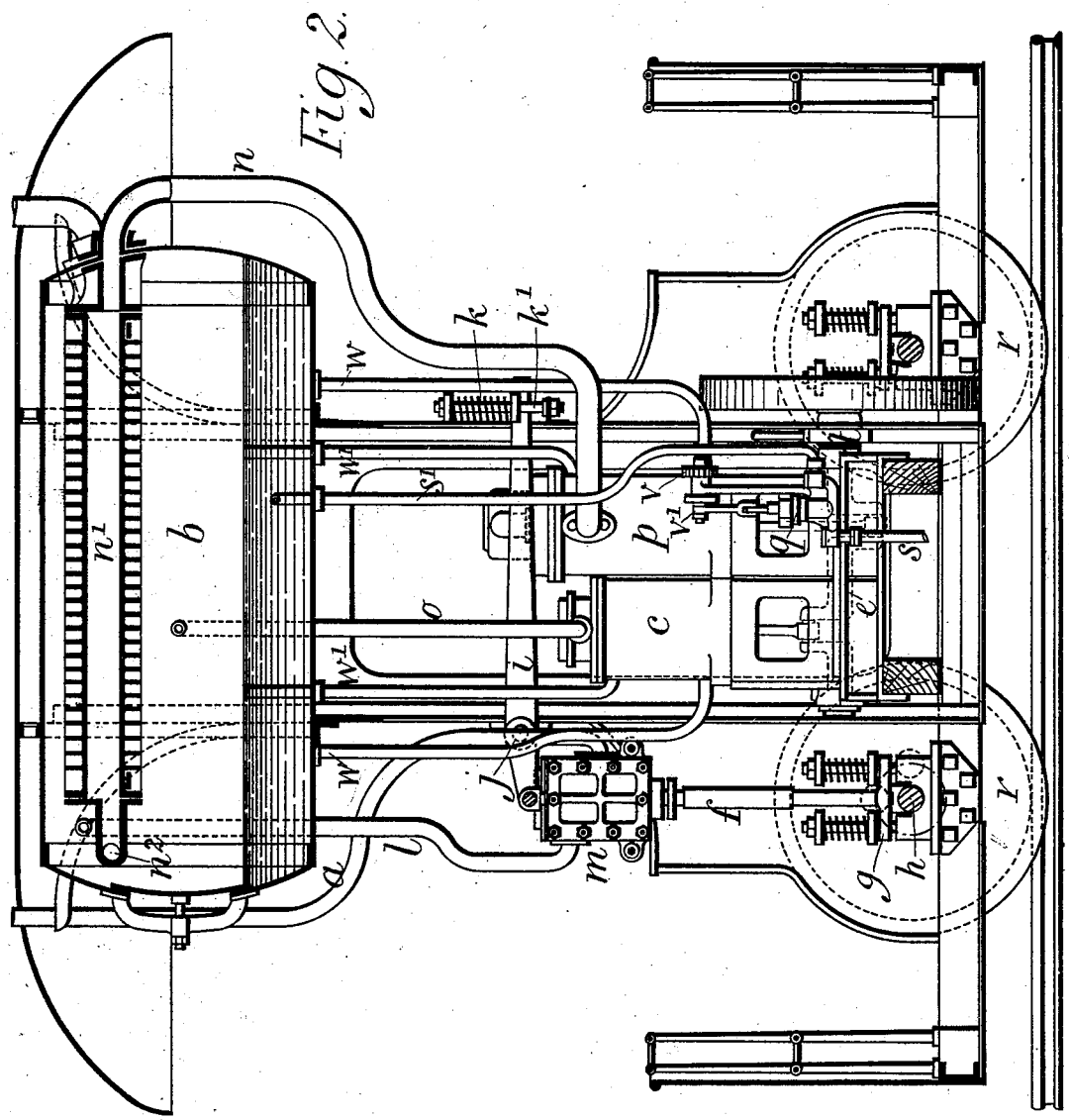
Figure 3:
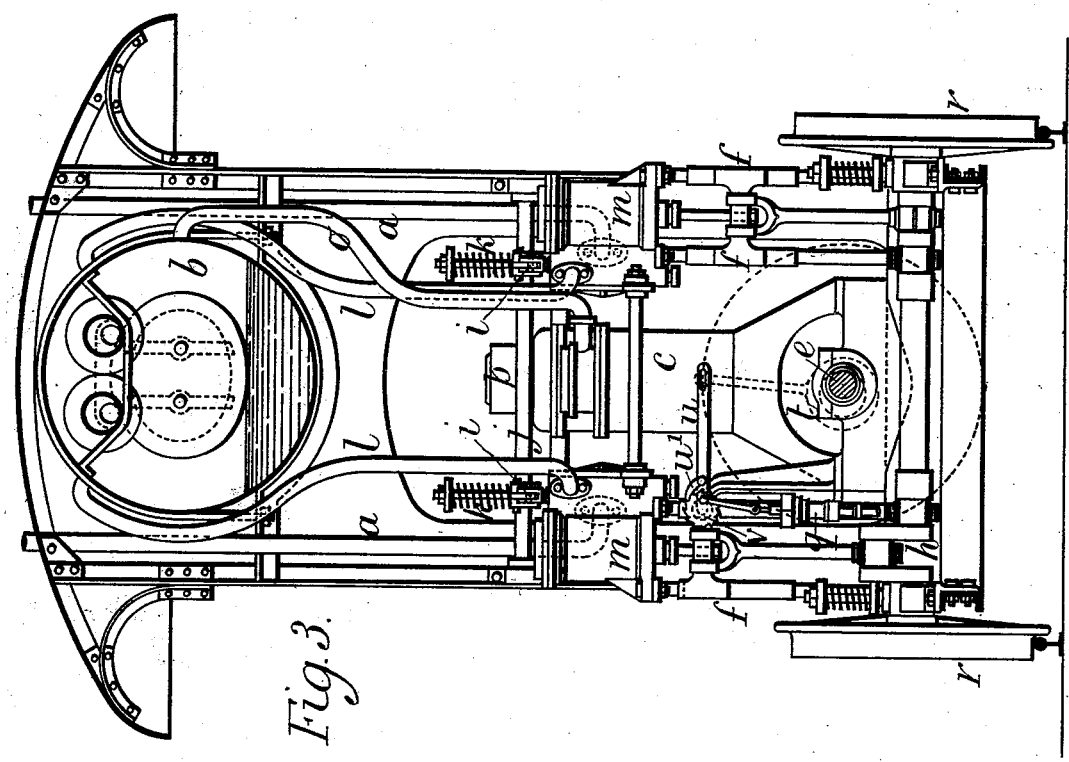

Figure 1 of the accompanying drawings shows a diagrammatic end view of part of a tramway vehicle with the before described combined machine applied thereto. Figs. 2, 3 and 4 show respectively a longitudinal section, a cross section and a sectional plan of the machine as actually constructed.

$p$ is the cylinder of the petroleum or gas motor engine, $c$ the cylinder of the air pump, $m\ m$ the two cylinders of the air pressure motor engine, $r$ the wheels of the tramway vehicle, $b$ the reservoir for the compressed air, $w$ the pipes for the cooling water, $n\ n'$ the discharge pipe of the petroleum motor, $l$ the air pressure supply pipes for the air engine, $a$ the discharge pipe of the air engine; $o$ the air charging pipe from the air pump to the reservoir.

The flow of the gases, air, and water is indicated by arrows.

In the construction shown in the diagram Fig. 1, the reservoir $b$ is shown arranged transversely of the carriage, for the sake of clearness, but in the actual construction it is preferred to arrange the same longitudinally, as shown at Figs. 2 and 3. In this arrangement, the cylinder of the petroleum motor engine $p$ and of the air compressing pump $c$ are arranged vertically over the engine shaft $e$, which works the air pump $c$.

The compressed air engine cylinders $m\ m$ are supported on the one hand by bars $f\ f$ connected to saddle pieces $g\ g'$ carried by the cranked axle $h$ to the cranks of which the connecting rods of the pistons are connected, and on the other hand their upper ends are supported by the one end of levers $i$ pivoted on a shaft $j$ carried by the framing and having their other ends connected through springs $k$ to rods $k'$ secured to the framing. Thus as the axle $h$ can move vertically relatively to the framing and the cylinders $m\ m$, being rigidly connected to the axle, partake of such relative motion, it will be seen that such motion is allowed by the elastic connection of the levers $i$ to the framing.

$q$ is the feed pump for supplying water to the reservoir $b$ for making good that which is carried off as vapor to the cylinders $m$ by the compressed air.

$s$ is the suction pipe, drawing water from a tank on the carriage not shown, and $s'$ is the supply pipe to the reservoir. The pump is driven at a slow speed from the rapidly revolving engine shaft $e$ by means of an eccentric $t$ on the latter connected to a lever $u$ pivoted to the framing and carrying a pawl $u'$ engaging with a ratchet wheel $v$ on a crank shaft $v'$ to which the piston rod of the pump is connected. Thus at every revolution of the engine shaft the pump shaft $v'$ is only turned through the fraction of a revolution due to one or more teeth of the ratchet wheel according as the pin of lever $u$ to which the eccentric $t$ is connected is set inward or outward in the slot of the lever.

The hot combustion gases are led from the petroleum motor $p$ through a pipe $n$ into a pipe $n'$ contained within the reservoir $b$ and which is provided with heat radiating flanges in order to give off a large proportion of the heat of the gases to the compressed air before issuing through the pipe $n^2$ into the atmosphere.

$l$ are the pipes supplying the compressed air to the cylinders of the engine $m\ m$. $a\ a$ are the discharge pipes from the said engine.

$o$ is the air charging pipe from the air pump to the reservoir.

$w\ w'$ are the circulating pipes through which the water circulates respectively from the reservoir $b$ to the jackets of the petroleum engine and air pump, and back from these to the reservoir.

Having thus described the nature of this invention and the best means I know for carrying the same into practical effect, I claim—

1. In a machine for propelling tramway vehicles, the combination of a motor engine worked by petroleum or gas, an air compressing pump worked by the petroleum engine and compressing air into a reservoir, a compressed air motor engine worked by the air in the compressed air reservoir, and imparting motion to the road wheels of the tramcar, a heat radiating pipe contained in the air reservoir through which the hot gaseous products from the petroleum motor engine are made to pass so as to heat the air, a water reservoir contained within the air reservoir, and serving both to cool the petroleum engine cylinder and the pump cylinder, and to give off steam to mix with the air for working the compressed air engine, and a feed pump worked by the petroleum motor engine for supplying water to the water reservoir substantially as described.

2. In a machine for propelling tramway vehicles, the combination of a petroleum motor engine $p$, an air compressing pump $c$ worked by the said engine, a reservoir $b$ for compressed air supplied by the said pump, pipes $n\ n'\ n^2$ passing through the reservoir $b$ through which the hot gases from the petroleum engine pass, a compressed air motor engine $m$ worked by compressed air from the said reservoir, and supported on the one hand by the axle of the road wheels and on the other hand by an elastic connection to the framing, and a feed pump $q$ for supplying water to the reservoir $b$, worked from the engine shaft $e$, substantially as described.

In testimony whereof I have signed my name to this specification, in the presence of two subscribing witnesses, this 28th day of July, A. D. 1893.

FRIEDRICH NEUKIRCH.

Witnesses.
HENRI BEHREN,
HERM. PIERHOFFA.